(12) United States Patent
Madden et al.

(10) Patent No.: US 12,334,589 B2
(45) Date of Patent: Jun. 17, 2025

(54) BIPOLAR STRUCTURES FOR USE WITH ELECTROCHEMICAL DEVICES, AND ASSOCIATED SYSTEMS AND METHODS

(71) Applicant: BenAn Energy, Shanghai (CN)

(72) Inventors: Thomas H. Madden, Glastonbury, CT (US); Daryl Ludlow, Lake George, NY (US); Karl Oleson, Seattle, WA (US); Honorio Valdes-Espinosa, Seattle, WA (US); Jian He, Shanghai (CN); XiouRui Hou, Shanghai (CN); David Hurt, Seattle, WA (US); Jay Dandrea, Pittsburgh, PA (US)

(73) Assignee: BENAN ENERGY, Shanghai (CN)

( * ) Notice: Subject to any disclaimer, the term of this patent is extended or adjusted under 35 U.S.C. 154(b) by 0 days.

(21) Appl. No.: 17/098,216

(22) Filed: Nov. 13, 2020

(65) Prior Publication Data

US 2021/0151725 A1    May 20, 2021

Related U.S. Application Data

(60) Provisional application No. 62/935,225, filed on Nov. 14, 2019.

(51) Int. Cl.
| | |
|---|---|
| *H01M 50/449* | (2021.01) |
| *H01M 4/02* | (2006.01) |
| *H01M 4/66* | (2006.01) |
| *H01M 10/058* | (2010.01) |
| *H01M 50/403* | (2021.01) |
| *H01M 50/431* | (2021.01) |
| *H01M 50/446* | (2021.01) |

(52) U.S. Cl.
CPC ......... *H01M 50/449* (2021.01); *H01M 4/663* (2013.01); *H01M 4/667* (2013.01); *H01M 4/668* (2013.01); *H01M 10/058* (2013.01); *H01M 50/403* (2021.01); *H01M 50/431* (2021.01); *H01M 50/446* (2021.01); *H01M 2004/029* (2013.01)

(58) Field of Classification Search
CPC .......................... H01M 50/446; H01M 50/449
See application file for complete search history.

(56) References Cited

U.S. PATENT DOCUMENTS

| | | | | |
|---|---|---|---|---|
| 2011/0305948 | A1* | 12/2011 | Miyatake | H01M 4/668 252/511 |
| 2015/0318555 | A1* | 11/2015 | Oku | B32B 27/365 429/245 |
| 2022/0328872 | A1 | 10/2022 | Koga | |

FOREIGN PATENT DOCUMENTS

| | | | | |
|---|---|---|---|---|
| JP | 2010170833 A | * | 8/2010 | |
| WO | WO-2019078160 A1 | * | 4/2019 | H01M 10/052 |

\* cited by examiner

*Primary Examiner* — Stephan J Essex
(74) *Attorney, Agent, or Firm* — Law Offices of Albert Wai-Kit Chan, PLLC

(57) ABSTRACT

Disclosed herein are polymer conductive films for use with electrochemical devices. An exemplary electrochemical device can include an anode, a cathode, and a bipolar structure disposed between the anode and cathode. The bipolar structure includes a film having a plurality of conductive particles and a plurality of non-conductive polymers, wherein the polymers are integrated with the particles such that the film is non-porous and substantially compositionally homogeneous along a length and/or thickness of the film.

14 Claims, 3 Drawing Sheets

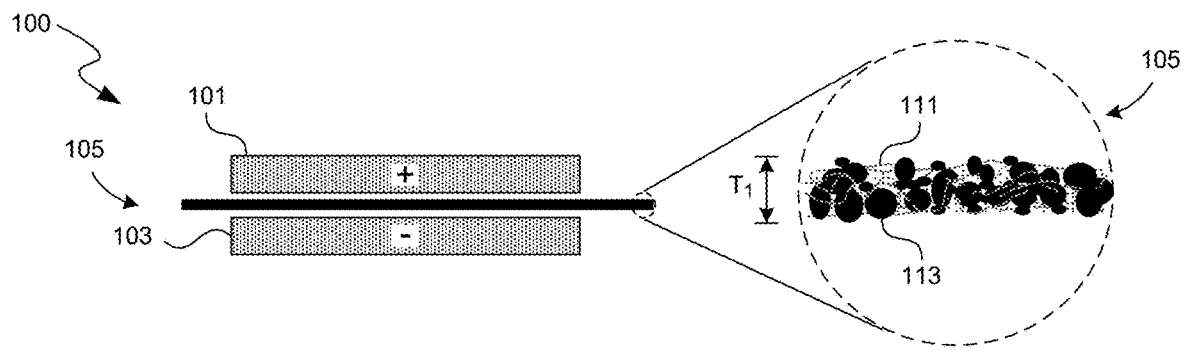
*FIG. 1A*  *FIG. 1B*
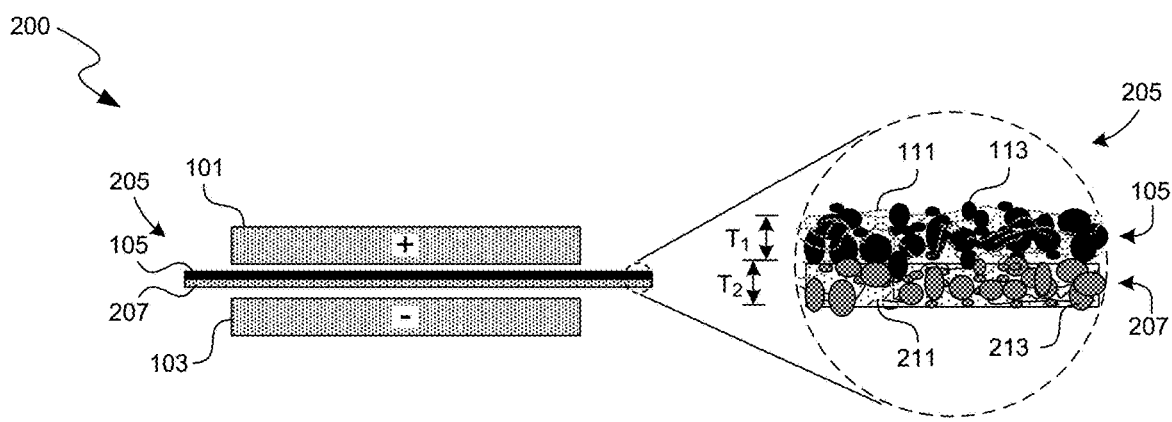
*FIG. 2A*  *FIG. 2B*
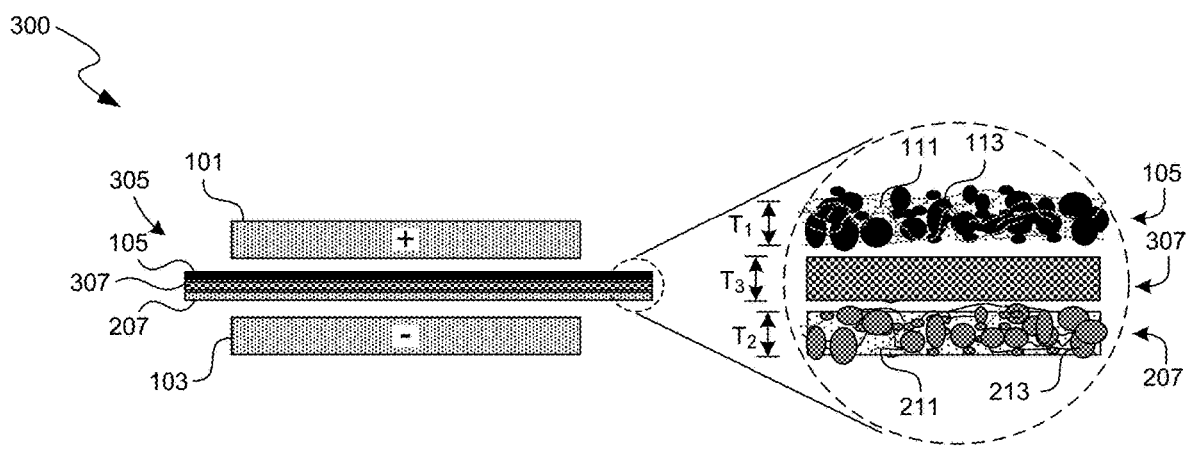
*FIG. 3A*  *FIG. 3B*

BIPOLAR STRUCTURES FOR USE WITH ELECTROCHEMICAL DEVICES, AND ASSOCIATED SYSTEMS AND METHODS

CROSS-REFERENCE TO RELATED APPLICATIONS

The present application claims the benefit of U.S. Provisional Patent Application No. 62/935,225, filed Nov. 14, 2019, the disclosure of which is incorporated herein by reference in its entirety.

TECHNICAL FIELD

This present disclosure relates to bipolar structures for use with electrochemical devices, and particular embodiments relate to bipolar structures including polymer conductive films.

BACKGROUND

For electrochemical devices utilizing a monopolar layer or design, anode-cathode unit cells are connected in parallel with current collectors above and below each unit cell. As such, monopolar designs typically need to connect additional devices in series to achieve consumer relevant voltages. As a result, the amount of connecting material (e.g., copper) needed can be costly, and the internal resistance of the device is relatively high. Furthermore, the connecting materials must contact the battery electrolyte environment, which can cause corrosion if incompatible materials exist. In this regard, the materials of monopolar designs often must be treated to be corrosion-resistant, e.g., through special alloys or surface coatings, which can significantly increase materials costs. This expense is further exaggerated for aqueous battery applications, as the cost advantages of a water-based electrolyte are easily negated. Accordingly, a need exists for an improved film design for use with electrochemical devices.

BRIEF DESCRIPTION OF THE DRAWINGS

Features, aspects, and advantages of the presently disclosed technology may be better understood with regard to the following drawings.

FIG. 1A is a partially schematic cross-sectional view of an electrochemical device including a film disposed between an electrode pair, and FIG. 1B is an enlarged view of a portion of the film, in accordance with embodiments of the present technology.

FIG. 2A is a partially schematic cross-sectional view of an electrochemical device including multiple films disposed between an electrode pair, and FIG. 2B is an enlarged view of a portion of the multiple films, in accordance with embodiments of the present technology.

FIG. 3A is a partially schematic cross-sectional view of an electrochemical device including a layer disposed between the multiple films of FIG. 2A, and FIG. 3B is an enlarged view of a portion of the layer and multiple films, in accordance with embodiments of the present technology.

Figure 4:
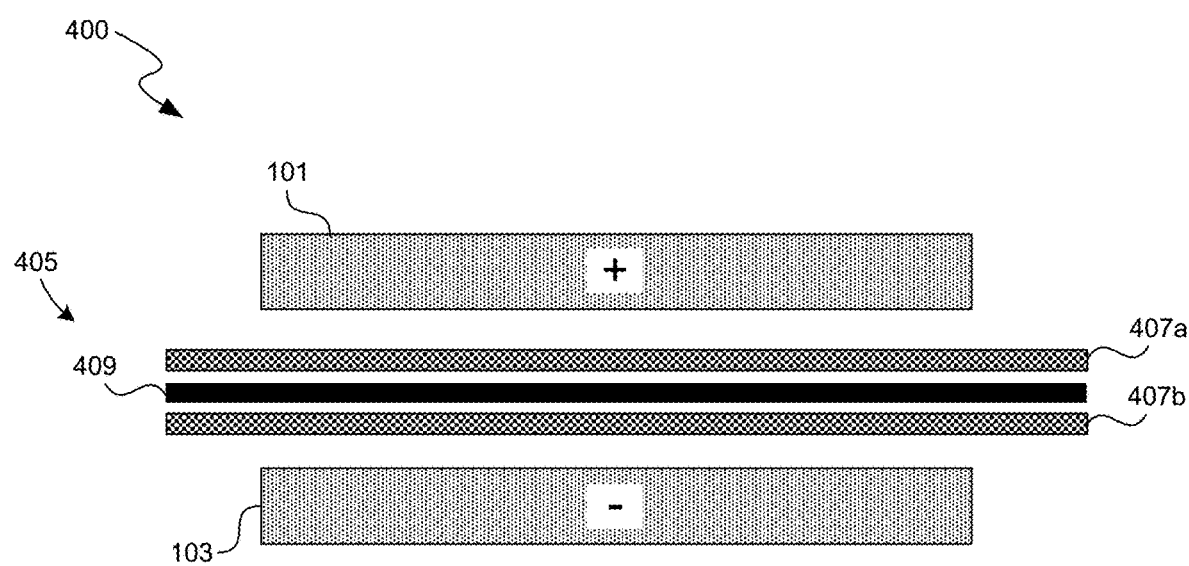
FIG. 4 is a partially schematic cross-sectional view of an electrochemical device including a bipolar layer disposed between an electrode pair, in accordance with embodiments of the present technology.

In the Figures, identical reference numbers identify generally similar, and/or identical, elements. Many of the details, dimensions, and other features shown in the Figures are merely illustrative of particular embodiments of the disclosed technology. Accordingly, other embodiments can have other details, dimensions, and features without departing from the spirit or scope of the disclosure. In addition, those of ordinary skill in the art will appreciate that further embodiments of the various disclosed technologies can be practiced without several of the details described below, and that the features shown in the drawings are for purposes of illustrations, and variations, including different and/or additional features and arrangements thereof, are possible.

DETAILED DESCRIPTION

I. Overview

Embodiments of the present technology address many of the issues that exist for current electrochemical devices and batteries. For example, unlike monopolar designs, embodiments of the present technology utilize bipolar batteries, in which anode-cathode unit cells are connected in series via conductive layers referred to as bipolar layers. As such, the bipolar layer material only needs to transfer charge over a very small distance relative to monopolar designs. In addition to needing significantly less conductive material and electrical connections relative to monopolar designs, bipolar designs of the present technology also provide a more uniform current distribution, isolate potential fluids from each unit cell when using non-porous bipolar layers, and potentially reduce contaminants associated with current collectors. Furthermore, bipolar layer materials require adequately low through-plane resistance, as opposed to monopolar layers which require low in-plane resistance. Such low through-plane resistance can be achieved through combinations of high electrical conductivity and short through-plane distances. The overall resistance through the bipolar layer can be expressed by the common relation with conductivity as:

$$R = 1/\sigma A,$$

wherein R is the resistance (ohms), l is the layer thickness (cm), $\sigma$ is the conductivity (S/cm), and A is the area (cm$^2$).

So long as the substantially non-porous condition is maintained, adequately low resistance can be achieved through sufficiently low thickness with only some degree of conductivity. By using relatively low thicknesses, the bipolar layer materials cost is reduced while the overall energy density of the device is enhanced. There are generally three methods of producing bipolar layers for electrochemical devices: (1) metal plates coated with corrosion-resistant films; (2) composites containing conductive additives such as conductive carbon, carbon nanotubes; and (3) sheets that are post-impregnated with polymer resin. However, while these methods are capable of producing bipolar layers with adequate material properties, they also tend to have high costs which have limited their implementation into electrochemical devices.

In this regard, embodiments of the present technology can also remove the need for these additional materials, and inhibit corrosion via a combination of mechanical design and utilizing specific materials for the underlying film or bipolar layer. Specifically, embodiments of the present technology avoid the need for these additional materials by utilizing an amount (e.g., proportion) of chemically-resistant, non-conductive polymer sufficient to form an impermeable layer to fluid within the film (or bipolar layer). Additionally, as explained in detail elsewhere herein, while the amount of polymer used is enough to form the impermeable layer within the film, the amount is not so much as to inhibit the necessary amount of conductivity, e.g., on a surface of or through the film.

In some embodiments, partially conductive bipolar films of the present technology can comprise a plurality of non-conductive polymers, and a plurality of conductive particles mixed with the polymers to form a substantially compositionally homogeneous structure. The amount or proportion of each of the non-conductive polymer and conductive particles of the film, as well as the thickness of the film, can be varied depending on the desired electrical (e.g., conductivity) and mechanical (e.g., flexibility, hardness, etc.) properties of the film. For example, in some embodiments the proportion of non-conductive polymer is high enough to form an effective layer, such that the film is non-porous and impermeable to fluid or ions (e.g., can create a water-tight seal). Relatedly, the proportion of the conductive particles should be sufficient to promote (e.g., prefer, via a path of less resistance) an electric charge to be carried across a thickness of the film (e.g., in a through-plane direction), as opposed to along a length of the film. The thickness of the film can be less than 0.5 mm, and thus be configured to occupy minimal volume in an electrochemical application, while still maintaining ion-impermeability and sufficient conductivity. The thickness of the film, as well as the compositional makeup, may also effectively act as a resistor in a direction along a length or surface of the film (e.g., perpendicular to the through-plane direction). In operation, the film can act as an anisotropic bipolar layer disposed between an anode and cathode electrode pair.

II. Bipolar Conductive Polymer Films

FIG. 1A is a partially schematic cross-sectional view of an electrochemical device 100 including a film 105 disposed between an electrode pair 101, 103, and FIG. 1B is an enlarged view of a portion of the film 105, in accordance with embodiments of the present technology. As shown in FIG. 1A, the device 100 includes a cathode 101, an anode 103, and a film 105 (e.g., a bipolar layer or structure) disposed between the cathode 101 and anode 103, which together form a battery cell when in operation. As shown in FIG. 1A, the film 105 can include substantially planar opposing surfaces facing the cathode 101 and anode 103. FIG. 1A shows just a single cell, but in other embodiments multiple cells may be arranged and operably coupled to one another in series, with the film 105 disposed between adjacent anode and cathode pairs. The cathode 101, film 105, and anode 103 shown in FIG. 1A (and FIGS. 1B-4) are spaced apart from one another for illustrative purposes, but in practice would abut one another and/or be in direct contact.

As shown in FIG. 1B, the film 105 includes a plurality of particles 113 and a polymer material or plurality of polymers 111 integrated with the particles 113. In some embodiments, the film 105 is made of only the polymer 111 and particles 113, and no other material. That is, the film 105 may not include additional coatings, additives, resins, or related costly materials commonly used to inhibit corrosion of bipolar films in operation. The particles 113 comprise a conductive material, and can include graphite, carbon black, oxides (e.g., tin oxide), metals (e.g., copper or iron), alloys, and/or combinations thereof. The polymers 111 comprise a non-conductive material, including polyethylene, polyurethane, polytetrafluoroethylene (PTFE), polyvinylidene fluoride (PVDF), and/or other related non-conductive materials used in battery or electrochemical device applications. Within the film 105, the polymer 111 can effectively act as a filler, such that the polymer 111 binds the individual particles 113 to one another to thereby form the film 105.

As described elsewhere herein, the polymer 111 and particles 113 can be combined by blending, which may include melting or otherwise liquefying the polymer 111 and adding the particles 113 thereto. In such embodiments, the blended product can then be made into the film 105 via blowing, die extrusion, or other related processes. In some embodiments, the polymer 111 can comprise individual strands, as shown in FIG. 1B, that are not bonded or coagulated with one another. Additionally or alternatively, the polymer 111 and particles 113 can be integrated with one another, such that the film 105 is compositionally homogenous along a length and/or thickness of the film 105. As used herein, the term "compositionally homogeneous" can refer to the substantial uniformity (e.g., less than 5%, 1%, or 0.1%) of a parameter, such as an amount (e.g., by weight or volume) of conductive parties or polymer material, over an area or volume. In but one example, the film 105 can be compositionally homogenous such that (i) the ratio of an amount of the particles 113 to the polymer 111 is substantially uniform along a length and/or thickness of the film 105, and/or (ii) the conductivity value along a length and/or thickness of the film 105 is substantially uniform.

The film 105 can have a thickness ($T_1$) of no more than 1.0 millimeters (mm), 0.9 mm, 0.8 mm, 0.7 mm, 0.6 mm, 0.5 mm, 0.4 mm, 0.3 mm, 0.2 mm, or 0.1 mm, or within a range of 0.1-1.0 mm. The thickness of the film 105 can be adjusted depending on a desired application or expected chemistry of the electrochemical device 100. For example, the thickness ($T_1$) of the film 105 can enable the film 105 to act as a resistor in a direction perpendicular to the thickness, e.g., along a length of the film 105. In doing so, a path of least resistance is created though the film 105 (e.g., along a direction of the thickness), and thus current flow through the film 105 is promoted and current flow along an outer surface or length of the film 105 is inhibited. Additionally or alternatively, the thickness ($T_1$) of the film 105 may be dictated by other factors, including the ability to cut the film 105, the desired resistance of the film 105, and/or the desired flexibility or durometer hardness of the film 105. In some embodiments, volume resistivity can be less than 1000 ohm-cm. In some embodiments, the film 105 can have a flexural modulus of less than 2.5 GPA, and a durometer (e.g., as measured using the Shore D Hardness Test) less than 100.

The amount or proportion of particles 113 relative to that of the polymer 111 can be varied based on the desired electrical and mechanical properties of the film 105. In some embodiments, the particles 113 can comprise at least 10%, 20%, 30%, 40%, 50%, 60%, or 70% of the film 105 by weight or volume, with the polymer forming the remainder of the film 105. The amount of polymer 111 relative to the amount of particles 113 can be based on the desired net conductivity of the film 105, with a greater proportion of particles 113 resulting in a higher net conductivity. In some embodiments, the amount of polymer is sufficient to effectively form a non-porous, ion-impermeable layer, e.g., that is water tight.

In operation, the device 100 can include an electrolyte fluid (not shown) disposed around and in contact with the cathode 101 and film 105, as well as the anode 103 and film 105, e.g., to enable ion transfer between the film 105 and each of the cathode 101 and anode 103. In such embodiments, the film 105 effectively acts as a bipolar layer, with a first side of the film 105 directly electrically connected to the cathode 101 and a second, opposing side of the film 105 directly electrically connected to the anode 103. As described elsewhere herein, the film 105 can be non-porous and thus prevent the electrolyte fluid from passing therethrough.

FIG. 2A is a partially schematic cross-sectional view of an electrochemical device 200 including multiple films disposed between an electrode pair, and FIG. 2B is an enlarged view of a portion of the multiple films, in accordance with embodiments of the present technology. The device 200 is similar to the device 100 described elsewhere herein, and thus can have similar features and functionality, but further includes an additional film. As shown in FIGS. 2A and 2B, the multiple films include the film 105 (e.g., a first film) described with reference to FIGS. 1A and 1B, and a second film 207 disposed proximate the first film 105 and between the cathode 101 and anode 103. The first film 105 and second film 207 together can form a bipolar layer 205. As shown in FIG. 2B, the second film 207 can include a plurality of particles 213 and a polymer material or a plurality of polymer materials 211 integrated with the particles 213. The polymer 211 and particles 213 can be identical to the respective polymer 111 and particles 113 described elsewhere herein, and/or have respective similar features and functionality. In such embodiments where the particles 213 are different than the particles 113, and/or the polymer 211 is different than the polymer 111, the chemical and/or electrical properties exhibited by outermost surfaces of the first film 105 and second film 207 differ. For example, in such embodiments the surface of the first film 105 facing the cathode 101 will exhibit a first set of chemical and/or electrical properties, whereas the surface of the second film 207 facing the anode 103 will exhibit a second set of chemical and/or electrical properties different than the first set. In some embodiments, this may manifest as having the bipolar layer surface facing the anode 103 comprise or consist of materials chemically resistant to the anode chemistry and anode side reaction products, while the cathode side bipolar layer surface is similarly suited for the cathode chemistry and side reactions.

In some embodiments, the film 207 is made of only the polymer 211 and particles 213, and no other material. Advantageously, this can enable embodiments of the present technology to avoid more expensive materials (e.g., fluoropolymers) that are broadly chemically-resistant, and instead use less expensive materials, such as the polymer 211 and particles 213 that are less broadly chemically-resistant but are tailored to be chemically-resistant for their local environment. To explain, the tendency of a cathode in an aqueous system in an overcharge situation is to produce a locally acidic environment, and thus the materials forming the layer proximate or nearest the cathode should be chemically resistant to acidic conditions. Similarly, the tendency of an anode in an aqueous system in an overcharge situation is to produce a locally basic environment, and thus the materials forming the layer nearest the anode should be chemically resistant to basic conditions. In view of these operational considerations, embodiments of the present technology utilize polymer 211 and/or particles 213 that are tailored to be chemically-resistance to their local environment. As such, these materials can be less expensive than other materials such as fluoropolymers that are more commonly used and that are more broadly chemically resistant.

The second film 207 can have the same or different length dimension as the first film 105, as well as the same or different thickness as the first film 105. For example, the second film 207 can have a thickness ($T_2$) of no more than 1.0 millimeters (mm), 0.9 mm, 0.8 mm, 0.7 mm, 0.6 mm, 0.5 mm, 0.4 mm, 0.3 mm, 0.2 mm, or 0.1 mm, or within a range of 0.1-1.0 mm. The thickness ($T_2$) of the second film 207 can be adjusted depending on a desired application or expected chemistry of the electrochemical device 200 and/or on the thickness ($T_1$) of the first film 105. For example, a thicker film or relatively thicker film may better fill in undulations or pores of the adjacent electrode surface and thus help minimize surface contact resistance between that electrode and the film. As another example, a thinner film or relatively thinner film may leave pores that are not filled in or filled in less by the adjacent electrode surface and thus increase the space for electrolyte transfer between the electrode surface and film surface. By having both the first film 105 and the second film 207, the thickness of each film can be adjusted to provide certain electrode properties, film stiffness, and other properties as desired. Additionally or alternatively, the thickness ($T_2$) of the second film 207 can enable the second film 207 to act as a resistor in a direction perpendicular to the thickness, e.g., along a length of the second film 207. In this sense, the films 105, 207 may be considered anisotropic. In doing so, a path of least resistance is created though the film 105 and/or 207 (e.g., along a direction of the thickness), and thus current flow through a thickness of the film 105 and/or 207 is promoted and current flow along an outer surface or length of the film 105 and/or 207 is inhibited. Additionally or alternatively, the thickness ($T_2$) of the second film 207 may be dictated by other factors, including the ability to cut the second film 207, the desired resistance of the second film 207, and/or the desired flexibility or durometer hardness of the second film 207.

FIG. 3A is a partially schematic cross-sectional view of an electrochemical device 300 including a layer 307 disposed between the multiple films 105, 207 of FIG. 2A, and FIG. 3B is an enlarged view of a portion of the layer 307 and multiple films 105, 207, in accordance with embodiments of the present technology. As shown in FIGS. 3A and 3B, the layer 307 is disposed between and proximate to each of the first film 105 and second film 207, and between the cathode 101 and anode 103. In some embodiments, the first film 105 and the second film 207 are spaced apart from one another via the layer 307. The first film 105, layer 307, and second film 207 together can form a bipolar layer 305. The layer 307 can add strength to the film 305, relative to films without the layer 307, e.g., to ensure the film 305 has sufficient flexural modulus. The layer 307 can comprise a mesh material, nylon, stainless steel, and/or combinations thereof. The bipolar layer 305 can have greater strength and decreased flexibility relative to the bipolar layer 205 (FIG. 2A). To better illustrate this concept, compressing either of the films 105, 207 can cause cracking, breaking, ripping at intersections thereof, which may further cause ionic shunting due to electrolyte transport across the films 105, 207. Reinforcement, e.g., via the layer 307, can mitigate this issue by increasing the strength of the bipolar layer 305.

FIG. 4 is a partially schematic cross-sectional view of an electrochemical device 400 including a bipolar layer 405 disposed between an electrode pair, in accordance with embodiments of the present technology. As shown in FIG. 4, the bipolar layer 405 includes a first layer 407a proximate the cathode 101, a second layer 407b proximate the anode 103, and a film 409 disposed between the first and second layers 407a,b. The film 409 can comprise any one or more of the films described elsewhere herein. For example, the film 409 can be the film 105, the film 207, or both films 105, 207. In some embodiments, the film 409 can comprise or consist of a polymer layer that is impermeable to fluid and has a continuous surface along its length, and that does not include any conductive particles or material. Each of the layers 407a,b can comprise a conformable material, such as graphite (e.g., graphite sheet, foil, etc.). In operation, each of the layers 407a,b is sandwiched between the film 409 and the adjacent cathode 101 or anode 103, and can have sufficient contact between the surfaces. For example, the conformable nature of the layers 407a,b allows any undulations or pores on the cathode 101 or anode 103 surfaces to be filled in by the respective layers 407a,b and thereby minimize contact resistance and/or maintain contact along substantially an entire surface area of the cathode 101 and anode 103 surfaces facing the bipolar layer 405. In some embodiments, each of the layers 407a,b can be identical to and/or include features generally similar to the layer 307 described elsewhere herein.

Figure 5:
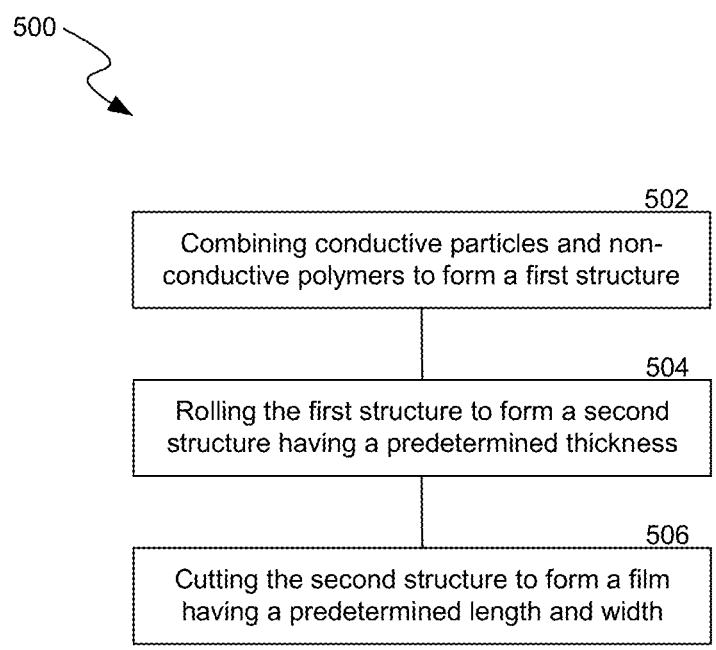
FIG. 5 is a flow diagram of a method for manufacturing an electrochemical device, in accordance with embodiments of the present technology.

FIG. 5 is a flow diagram of a method 500 for manufacturing an electrochemical device (e.g., the device 100, 200, 300, or 400), in accordance with embodiments of the present technology. The method 500 can comprise combining conductive particles (e.g., the particles 113; FIG. 1B) and non-conductive polymers (e.g., the polymers 111; FIG. 1B) to form a first structure (process portion 502). Combining the conductive particles and non-conductive polymers can comprise blending the conductive particles and non-conductive polymers, such that the first structure is substantially compositionally homogenous, as previously described. In some embodiments, being substantially compositionally homogenous can be defined as exhibiting substantially the same chemical and/or electrical properties across a length and/or thickness of the structure (or resulting film). Additionally or alternatively, combining the conductive particles and non-conductive polymers can comprise melting or liquefying the non-conductive polymers and adding the conductive particles to the melted or liquefied polymers.

The method 500 can further comprise rolling the first structure to form a second structure having a predetermined thickness (process portion 504). The thickness can correspond to the thickness ($T_1$) described elsewhere herein, and thus can be no more than 1.0 mm, 0.9 mm, 0.8 mm, 0.7 mm, 0.6 mm, 0.5 mm, 0.4 mm, 0.3 mm, 0.2 mm, or 0.1 mm, or within a range of 0.1-1.0 mm. The thickness of the film 105 can be adjusted depending on a desired application or expected chemistry of the end film or electrochemical device. Rolling the first structure can also be performed such that the second structure has a predetermined flexibility or durometer.

The method 500 can further comprise cutting the rolled structure to form a film having a predetermined length and width (process portion 506). The film can be that of any of the films (e.g., the film 105 or the film 207) described elsewhere herein.

III. Conclusion

It will be apparent to those having skill in the art that changes may be made to the details of the above-described embodiments without departing from the underlying principles of the present technology. In some cases, well known structures and functions have not been shown or described in detail to avoid unnecessarily obscuring the description of the embodiments of the present technology. Although steps of methods may be presented herein in a particular order, alternative embodiments may perform the steps in a different order. Similarly, certain aspects of the present technology disclosed in the context of particular embodiments can be combined or eliminated in other embodiments. Furthermore, while advantages associated with certain embodiments of the present technology may have been disclosed in the context of those embodiments, other embodiments can also exhibit such advantages, and not all embodiments need necessarily exhibit such advantages or other advantages disclosed herein to fall within the scope of the technology. Accordingly, the present technology and associated technology can encompass other embodiments not expressly shown or described herein, and the invention is not limited except as by the appended claims.

Throughout this disclosure, the singular terms "a," "an," and "the" include plural referents unless the context clearly indicates otherwise. Similarly, unless the word "or" is expressly limited to mean only a single item exclusive from the other items in reference to a list of two or more items, then the use of "or" in such a list is to be interpreted as including (a) any single item in the list, (b) all of the items in the list, or (c) any combination of the items in the list. Additionally, the term "comprising," "including," and "having" should be interpreted to mean including at least the recited feature(s) such that any greater number of the same feature and/or additional types of other features are not precluded.

Reference herein to "one embodiment," "an embodiment," "some embodiments" or similar formulations means that a particular feature, structure, operation, or characteristic described in connection with the embodiment can be included in at least one embodiment of the present technology. Thus, the appearances of such phrases or formulations herein are not necessarily all referring to the same embodiment. Furthermore, various particular features, structures, operations, or characteristics may be combined in any suitable manner in one or more embodiments.

Unless otherwise indicated, all numbers expressing concentrations, shear strength, and other numerical values used in the specification and claims, are to be understood as being modified in all instances by the term "about." Accordingly, unless indicated to the contrary, the numerical parameters set forth in the following specification and attached claims are approximations that may vary depending upon the desired properties sought to be obtained by the present technology. At the very least, and not as an attempt to limit the application of the doctrine of equivalents to the scope of the claims, each numerical parameter should at least be construed in light of the number of reported significant digits and by applying ordinary rounding techniques. Additionally, all ranges disclosed herein are to be understood to encompass any and all subranges subsumed therein. For example, a range of "1 to 10" includes any and all subranges between (and including) the minimum value of 1 and the maximum value of 10, i.e., any and all subranges having a minimum value of equal to or greater than 1 and a maximum value of equal to or less than 10, e.g., 5.5 to 10.

The disclosure set forth above is not to be interpreted as reflecting an intention that any claim requires more features than those expressly recited in that claim. Rather, as the following claims reflect, inventive aspects lie in a combination of fewer than all features of any single foregoing disclosed embodiment. Thus, the claims following this Detailed Description are hereby expressly incorporated into this Detailed Description, with each claim standing on its own as a separate embodiment. This disclosure includes all permutations of the independent claims with their dependent claims.

The present technology is illustrated, for example, according to various aspects described below. Various examples of aspects of the present technology are described as numbered examples (1, 2, 3, etc.) for convenience. These are provided as examples and do not limit the present technology. It is noted that any of the dependent examples may be combined in any combination, and placed into a respective independent example. The other examples can be presented in a similar manner.

1. An electrochemical device, comprising:
   an anode;
   a cathode; and
   a bipolar structure disposed between the anode and cathode, the structure comprising a film including a plurality of conductive particles, and a plurality of non-conductive polymers, the polymers being integrated with the individual conductive particles, such that the film is (i) impermeable to ions and (ii) compositionally homogenous along a length of film and/or a thickness of the film.

2. The device of any one of the clauses herein, wherein the film is antistatic.

3. The device of any one of the clauses herein, wherein the film is anisotropic such that, in operation, a conductive pathway through the film from one of the anode or cathode to the other of the anode of cathode has less resistance than a pathway (i) to side reaction sites adjacent to the anode or cathode, and/or (ii) along a surface of the film.

4. The device of any one of the clauses herein, wherein a net conductivity of the film is less than a conductivity of the individual conductive particles.

5. The device of any one of the clauses herein, wherein the polymers comprise at least one of polyethylene, polyurethane, PTFE, or PVDF.

6. The device of any one of the clauses herein, wherein the polymers comprise individual strands extending along at least a portion of a length of the film.

7. The device of any one of the clauses herein, wherein the particles comprise at least one of graphite, carbon black, metals, copper, iron, oxides, tin oxide.

8. The device of any one of the clauses herein, wherein the plurality of particles comprise at least 10%, 20%, 30%, 40%, 50%, 60%, or 70% of the film by weight or volume, and wherein the plurality of polymers comprise the remainder of the film.

9. The device of any one of the clauses herein, wherein the plurality of polymers comprise at least 10%, 20%, 30%, 40%, 50%, 60%, or 70% of the film by weight or volume, and wherein the plurality of particles comprise the remainder of the film.

10. The device of any one of the clauses herein, wherein the film consists of only the conductive particles and the polymers.

11. The device of any one of the clauses herein, wherein the film includes no other materials other than the conductive particles and the polymers.

12. The device of any one of the clauses herein, wherein the thickness of the film is no more than 0.5 mm, 0.4 mm, 0.3 mm, 0.2 mm, or 0.1 mm.

13. The device of any one of the clauses herein, wherein the polymers are integrated with the conductive particles such that, in operation, formation of dendrites are inhibited.

14. The device of any one of the clauses herein, wherein the polymer strands are integrated with the conductive particles such that metal film growth is promoted on a surface of the film.

15. The device of any one of the clauses herein, further comprising an electrolyte fluid disposed around the film, wherein the film is impermeable to the fluid.

16. The device of any one of the clauses herein, wherein the film has a pair of opposing substantially planar surfaces.

17. The device of any one of the clauses, wherein the film is a first film, the conductive particles are first conductive particles, and the polymers are first polymers, the device further comprising a second film disposed over the first film and between the anode and cathode, the second film comprising a plurality of individual second conductive particles, and a plurality of second non-conductive polymers each extending along at least a portion of a length of the film, the second polymers being integrated with the individual second conductive particles.

18. The device of clause 17, wherein the electrical and/or chemical properties at a surface of the first film facing the anode differ from the respective electrical and/or chemical properties at a surface of the second film facing the cathode.

19. The device of clause 17 or 18, wherein the first polymers comprise a first material and the second polymers comprise a second material different than the first material.

20. The device of any one of clauses 17-19, wherein the first conductive particles comprise a first material and the second conductive particles comprise a second material different than the first material.

21. The device of any one of clauses 17-20, wherein the first film is adhered to and/or in direct contact with the second film.

22. The device of any one of clauses 17-21, further comprising a layer disposed between the first film and the second film such that the first film contacts a first side of the layer and the second film contacts a second, opposing side of the layer.

23. The device of clause 22, wherein the layer comprises at least one of a mesh material, nylon, stainless steel, an alloy, or combinations thereof.

24. The device of clause 22 or 23, wherein the layer is a first layer, the device further comprising a second layer disposed between the cathode and the first film.

25. The device of clause 24, further comprising a third layer disposed between the anode and the second film.

26. The device of clause 24 or 25 wherein the second film and the third film each comprise at least one of stainless steel or graphite.

27. A method of manufacturing an electrochemical device, the method comprising:
   combining a plurality of conductive particles and a plurality of non-conductive polymers to form a first structure that is substantially compositionally homogenous;
   rolling the first structure to form a second structure having a predetermined thickness; and
   cutting the rolled structure to form a film having a predetermined length and width.

28. The method of clause 27, wherein the film is the film of any one of the clauses herein.

29. The method of any one of the clauses herein, wherein combining comprises liquefying the polymers and adding the particles to the liquefied polymers.

30. The method of any one of the clauses herein, wherein the predetermined thickness is no more than 0.5 mm, 0.4 mm, 0.3 mm, 0.2 mm, or 0.1 mm.

31. An electrochemical device, comprising:
an anode;
a cathode; and
a bipolar structure disposed between the anode and cathode, the bipolar structure comprising—
a first layer proximate the anode;
a second layer proximate the cathode; and
a film disposed between the first and second layers, the film comprising a plurality of conductive particles and a plurality of non-conductive polymers, the polymers being integrated with the individual conductive particles such that (i) the film forms an impermeable layer to fluid, and (ii) an outer surface of the film is compositionally homogenous.

32. The device of any one of the clauses herein, wherein the polymers comprise at least one of polyethylene, polyurethane, PTFE, or PVDF.

33. The device of any one of the clauses herein, wherein the first and second layers each comprise a graphite sheet.

34. The device of any one of the clauses herein, wherein:
the film directly contacts each of the first layer and the second layer via opposing planar surfaces of the film, and
the first layer directly contacts the anode such that the graphite of the first layer compressively conforms to a surface of the anode.

35. The device of any one of the clauses herein, wherein the particles comprise at least one of graphite, carbon black, copper, iron, oxides, or tin oxide.

36. The device of any one of the clauses herein, wherein the polymers comprises between 20%-50% of the film by weight or volume.

37. The device of any one of the clauses herein, wherein the film consists of only the polymers and the conductive particles, and wherein the conductive particles comprise between 50-80% of the film by weight or volume such that the film has a net conductivity above a predetermined threshold.

38. The device of any one of the clauses herein, wherein the film has a thickness between 0.1 millimeters (mm) and 0.3 mm.

39. The device of any one of the clauses herein, wherein:
the outer surface is a first outer surface facing the anode, and
the electrical and/or chemical properties at the first outer surface of the film differ from the respective electrical and/or chemical properties at a second outer surface of the film facing the cathode.

40. A battery, comprising:
electrolyte fluid; and
an electrochemical device surrounded by the electrolyte fluid, the electrochemical device comprising—
an anode;
a cathode; and
a bipolar structure disposed between the anode and cathode, the bipolar structure comprising—
a first layer proximate the anode;
a second layer proximate the cathode; and
a film disposed between the first and second layers, the film comprising a plurality of conductive particles and a plurality of non-conductive polymers, the polymers being integrated with the individual conductive particles such that the film forms an impermeable layer configured to prevent the electrolyte fluid from passing therethrough.

41. The battery of any one of the clauses herein, wherein an outer surface of the film is compositionally homogenous.

42. The battery of any one of the clauses herein, wherein the polymers comprise at least one of polyethylene, polyurethane, PTFE, or PVDF.

43. The battery of any one of the clauses herein, wherein the first and second layers each comprise a graphite sheet.

44. The battery of any one of the clauses herein, wherein:
the film directly contacts each of the first layer and the second layer via opposing planar surfaces of the film,
the first layer directly contacts the anode such that the graphite of the first layer compressively conforms to a surface of the anode, and
the second layer directly contacts the cathode such that the graphite of the second layer compressively conforms to a surface of the cathode.

45. The battery of any one of the clauses herein, wherein the polymers comprises between 20%-50% of the film by weight or volume.

46. The battery of any one of the clauses herein, wherein the film consists of only the polymers and the conductive particles, and wherein the conductive particles comprise between 50-80% of the film by weight or volume such that the film has a net conductivity above a predetermined threshold.

47. A method of manufacturing an electrochemical device, the method comprising:
combining a plurality of conductive particles and a plurality of non-conductive polymers to form a first structure that is substantially compositionally homogenous and impermeable to fluid;
rolling the first structure to form a second structure having a thickness of no more than 0.5 millimeters;
cutting the rolled structure to form a film having a predetermined length and width; and
disposing the film between a first layer and a second layer to form a bipolar structure, the first and second layers comprising graphite; and
operably coupling the bipolar structure to an anode and cathode such that the graphite of each of the first and second layers compressively conform to a respective surface of the anode and cathode.

48. The method of any one of the clauses herein, wherein the polymers comprise at least one of polyethylene, polyurethane, PTFE, or PVDF, and wherein the particles comprise at least one of graphite, carbon black, copper, iron, oxides, or tin oxide.

49. The method of any one of the clauses herein, wherein the polymers comprises between 20%-50% of the film by weight or volume.

50. The method of any one of the clauses herein, wherein the film consists of only the polymers and the conductive particles, and wherein the conductive particles comprise between 50-80% of the film by weight or volume such that the film has a net conductivity above a predetermined threshold.

We claim:
1. An aqueous battery system, comprising:
an anode;
a cathode; and
a bipolar structure disposed between the anode and cathode, the bipolar structure comprising
a first layer proximate the anode;
a second layer proximate the cathode; and
a film disposed between the first and second layers, the film comprising a plurality of conductive particles and a plurality of non-conductive polymers, the polymers being integrated with the conductive particles such that

(i) the film forms an impermeable layer to fluid, and (ii) an outer surface of the film is compositionally homogenous;

wherein the first and second layers each comprises a graphite sheet, or each comprises 50-80% of graphite and non-conductive polymers; wherein said non-conductive polymers in said film and said first and second layers are selected from polyethylene, polypropylene, polytetrafluoroethylene (PTFE) and polyvinylidene fluoride (PVDF).

2. The device system of claim 1, wherein the first and second layers each comprise graphite, the film directly contacts each of the first layer and the second layer via opposing planar surfaces of the film, and the first layer directly contacts the anode such that the graphite of the first later compressively conforms to a surface of the anode.

3. The system of claim 1, wherein the particles comprise at least one of graphite, carbon black, copper, iron, oxides, and tin oxide.

4. The system of claim 1, wherein the film is anisotropic such that, in operation, a first conductive pathway through the film from one of the anode or cathode to the other of the anode of cathode has less resistance than a second conductive pathway along a surface of the film.

5. The system of claim 1, wherein 20%-50% of the film is composed of polymers by weight or volume.

6. The system of claim 5, wherein the rest of the film is composed of conductive particles by weight or volume such that the film has a net volume resistivity less than 1000 ohm-cm.

7. The system of claim 1, wherein the film has a thickness from 0.1 millimeters (mm) to 0.3 mm.

8. The system of claim 1, wherein the outer surface is a first outer surface facing the anode, where side reactions driven by anode potentials differ from side reactions driven by cathode potentials at a second outer surface of the film facing the cathode.

9. An aqueous battery, comprising:
electrolyte fluid; and
an electrochemical device surrounded by the electrolyte fluid,
the electrochemical device comprising
an anode;
a cathode; and
a bipolar structure disposed between the anode and cathode, the bipolar structure comprising
a first layer proximate the anode;
a second layer identical to the first layer and proximate the cathode; and
a film disposed between the first and second layers, the film comprising a plurality of non-conductive polymers that form an impermeable layer configured to prevent the electrolyte fluid from passing therethrough;
wherein the first and second layers each comprises a graphite sheet, or each comprises 50-80% of graphite and non-conductive polymers, wherein said non-conductive polymers in said film and said first and second layers are selected from polyethylene, polypropylene, polytetrafluoroethylene (PTFE) and polyvinylidene fluoride (PVDF).

10. The battery of claim 9, wherein the film further comprises a plurality of conductive particles integrated with the polymers such that an outer surface of the film is compositionally homogenous.

11. The battery of claim 9, wherein the first and second layers each comprises a graphite sheet.

12. The battery of claim 11, wherein:
the film directly contacts each of the first layer and the second layer via opposing planar surfaces of the film,
the first layer directly contacts the anode such that the graphite of the first layer compressively conforms to a surface of the anode, and
the second layer directly contacts the cathode such that the graphite of the second layer compressively conforms to a surface of the cathode.

13. The battery of claim 9, wherein 20%-50% of the film is composed of polymers by weight or volume.

14. The battery of claim 13, wherein the rest of the film is composed of conductive particles by weight or volume such that the film has a net volume resistivity less than 1000 ohm-cm.

* * * * *